Nov. 17, 1936. W. F. FOLMER ET AL 2,061,458
INSECT EXTERMINATING DEVICE
Filed May 9, 1933 3 Sheets-Sheet 1
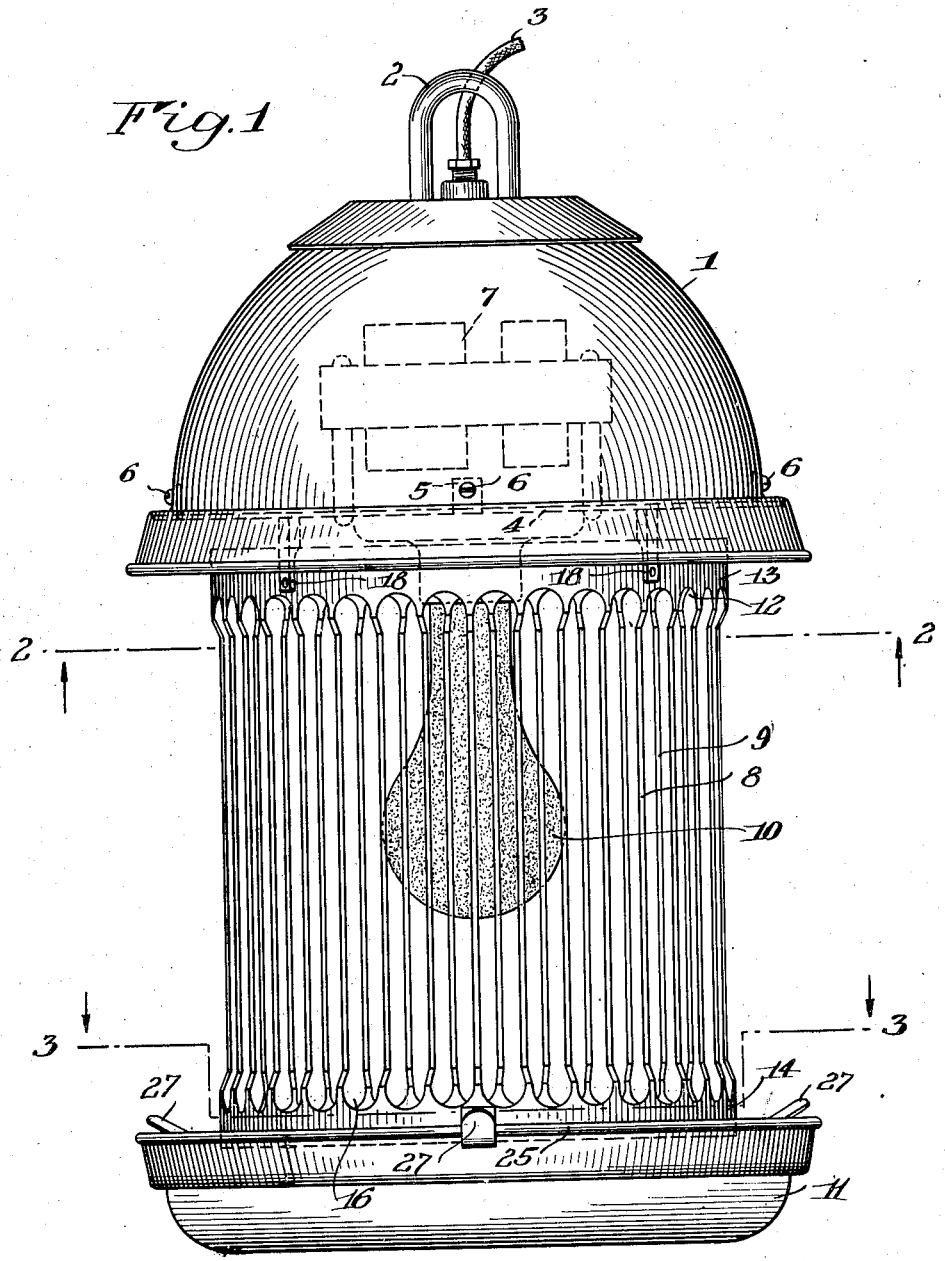
INVENTORS
William F. Folmer
Harrison L. Chapin
BY
Their ATTORNEY

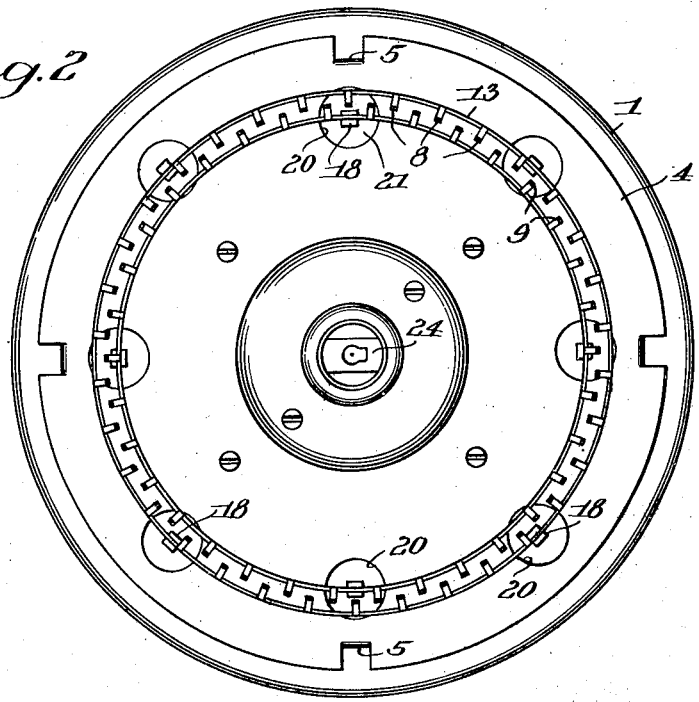
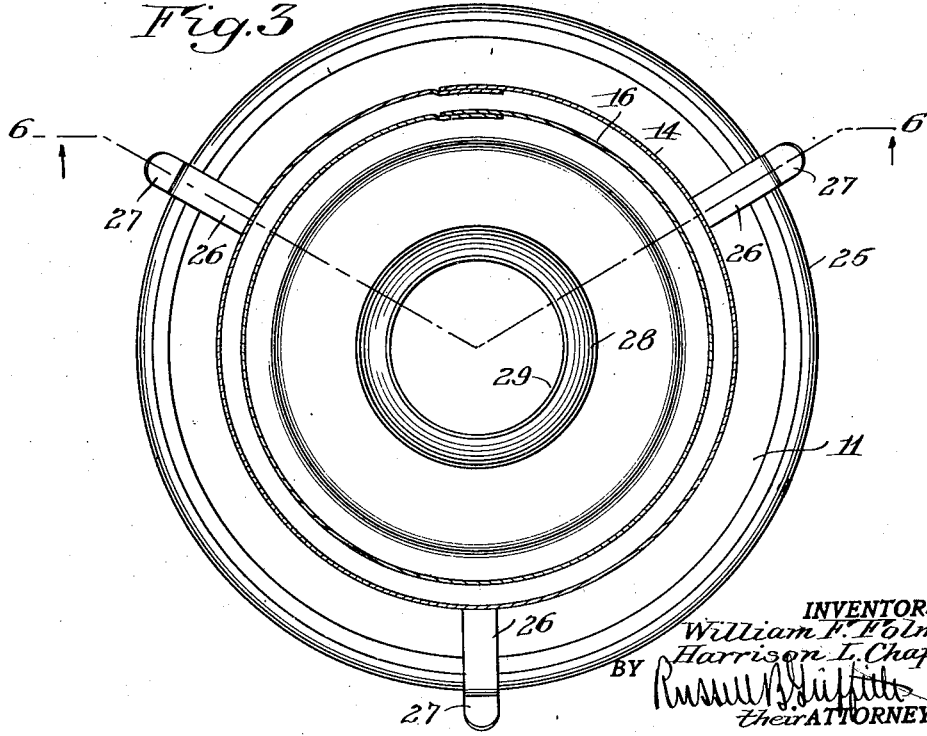

Nov. 17, 1936.   W. F. FOLMER ET AL   2,061,458
INSECT EXTERMINATING DEVICE
Filed May 9, 1933    3 Sheets-Sheet 3
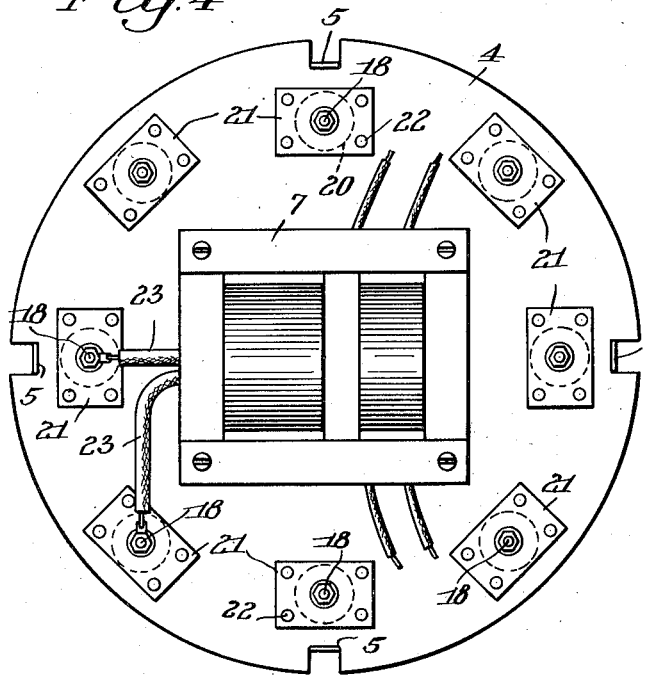
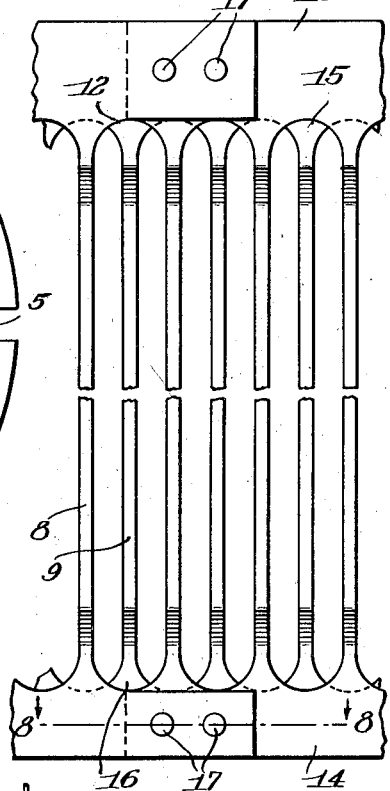
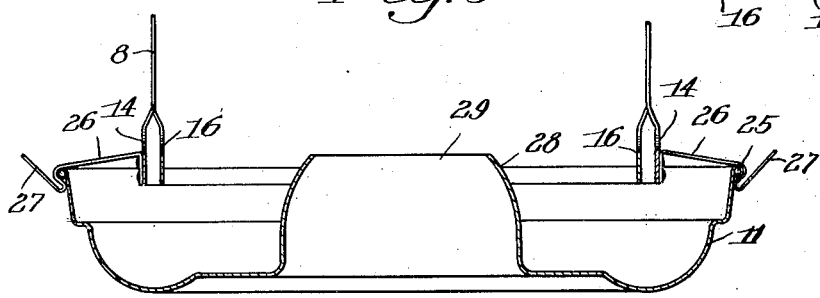
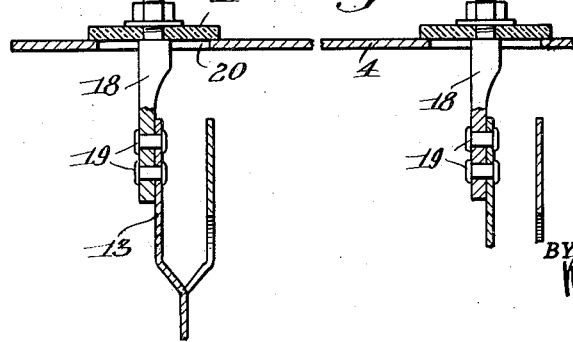
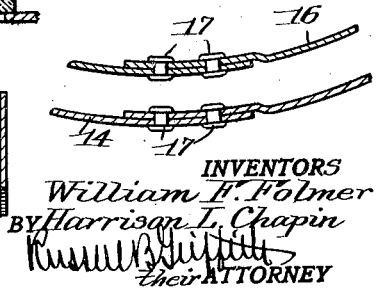
INVENTORS
William F. Folmer
Harrison L. Chapin
BY
their ATTORNEY Patented Nov. 17, 1936

2,061,458

UNITED STATES PATENT OFFICE 2,061,458

INSECT EXTERMINATING DEVICE

William F. Folmer and Harrison L. Chapin, Rochester, N. Y., assignors, by mesne assignments, to Joseph K. Davidson, Rochester, N. Y.

Application May 9, 1933, Serial No. 670,142

3 Claims. (Cl. 43—112)

Our present invention relates to insect exterminators of the general nature employing a baffle composed of alternated electrodes of opposite polarities and suitably spaced to be short circuited by flying insect bodies that contact them, such baffles being used with or without the provision of suitable lures on the inaccessible side. It has for its broad object to provide a durable and effective exterminator of this character that will be simple in construction and may be produced at relatively low cost. The improvements are directed in part toward the construction and assembly of the baffle unit; toward the provision of a pan of advantageous construction for catching insect bodies, and toward the provision of a more effective lighting arrangement when illumination is utilized as a lure. To these and other ends, the invention resides in certain improvements and combinations of parts, all as will be hereinafter more fully described, the novel features being pointed out in the claims at the end of this specification.

In the drawings:

Fig. 1 is an elevation of a cage type of exterminator constructed in accordance with and illustrating one embodiment of our invention;

Fig. 2 is a horizontal section taken on the line 2—2 of Fig. 1 and looking in the direction of the arrows, the lamp being removed;

Fig. 3 is a horizontal section taken on the line 3—3 of Fig. 1 looking in the direction of the arrows;

Fig. 4 is a plan view of the upper platform or stage with the dome housing removed;

Fig. 5 is an enlarged fragmentary elevation, broken away at the center, of a group of the electrodes;

Fig. 6 is a vertical section taken substantially on the line 6—6 of Fig. 3;

Fig. 7 is an enlarged detail vertical section broken away at the center taken through the upper state to illustrate the terminal connections of the electrodes, and Fig. 8 is a section on the line 8—8 of Fig. 5.

Similar reference numerals throughout the several views indicate the same parts.

Although certain features thereof are not exclusively applicable to insect destroyers of that particular type, this invention, in general, and with respect to the particular embodiment illustrated constitutes an improvement upon the invention of our prior patent, No. 1,848,614, dated March 8, 1932. This being the case and the disclosure there being complete, the present description will make reference only briefly to the major elements of the old combination, such details as assembly and circuit arrangements being omitted.

Referring more particularly to the drawings, 1 indicates a dome or housing adapted to be suspended in a locality infested by the insects by an eye 2 at the top thereof, through which also is introduced a suitable connection 3 from the line wire or prime source of electrical energy. The base of the dome carries a flooring or stage 4, shown in plan in Fig. 4, which is supported by lugs 5 and screws 6 and erected on this stage within the protection of the dome is a transformer unit, indicated generally at 7, for stepping up the line voltage to the required high tension of 3,000 volts or more. Depending from the stage is the cylindrical barrier or cage composed of the alternating positive and negative electrode wires 8 and 9 housing the lure lamp 10, at the bottom of which is the detachable pan 11 which may be optionally used to catch the insect bodies.

To first explain the feature of the construction of the cage or barrier, instead of the continuous looped wires of our patent above referred to, we obtain the same ultimate result with sheet metal stampings. Two strips of sheet metal of suitable gauge are stamped with rows of elongated perforations 12 sufficiently spaced to produce the wires 8 and 9 of a cross section supplying adequate mechanical strength and electrical capacity. The remainder of the strips at the upper and lower margins emerge as rings 13 and 14 on what we will designate as the positive group of electrode wires 8 and 15 and 16 on the negative group. The sheets or strips are then rolled into cylinders and the overlapping ends of the rings riveted or similarly secured together, as indicated at 17. The negative cylinder 15—16 is smaller than the other to be encompassed thereby in radially spaced relationship so that rings are air insulated from each other. The respective wire electrodes 8 and 9 alternate with each other so that those of one group come opposite the centers of the openings 12 of the other group. Either before or after the cylinder is formed, each group of wires is directionally oppositely offset, as by a forming die, so that each such set of wires actually occupies the openings of the other set, as appears from a comparison of Figs. 2 and 6. This brings all of the wires of both groups into the same circumference or cylindrical plane with the positive and negative electrodes spaced just sufficiently to prevent arcing and yet close enough together that their electrified zones will prevent the passage of even tiny insect bodies without inducing the arc. The resulting arrangement has all the advantages and possibilities of the wire construction referred to yet it is stiffer, stronger and much easier and cheaper to manufacture with enduring exactitude.

The cage is hung from the stage 4 by the independent insulated attachment thereto of the inner and outer spaced top rings 13 and 15 of the respective electrode elements in the manner best shown in Figs. 4 and 7. The lower ends of binding posts 18 are riveted thereto at 19 and extend through wide openings 20 in the stage 4 and through individual insulating blocks 21 bridging the openings and riveted to the stage at 22. Of course, only two of these have to be connected to the wires 23 of the transformer 7, as shown, the others acting merely as supporting bolts. In Fig. 2, where a bottom plan view of the stage and these supporting bolts is shown, the lamp bulb 10 is omitted, the usual socket therefor appearing at 24.

The catch pan 11, as best shown in Figs. 3 and 6, is an annular body provided with a rolled bead 25 at its rim which is engaged by radially extending spring catches 26 provided with releasing finger pieces 27. The catches are secured to the outer lower ring 14 of the positive electrode only and the pan may then be readily attached or applied, according to whether or not it is desired to collect the insect bodies or the nature of the environment is such it is desirable to let them fall free.

We have discovered, however, that the shadow cast by the solid bottomed pans hitherto used by us lessens the efficiency of the lure, that is, a free open bottomed baffle cage will destroy more insects than one with a pan. We, therefore, truncate the dome 28 provided at the center, which still furnishes sufficient capacity for a large accumulation of insect bodies directly below the wires but leaves an opening 29 at the center. Through this opening the lamp 10 sheds a cone of light downwardly. Low flying insects, otherwise shadowed, striking into this cone of light, will climb it, passing up through the opening 29 and into the cage where they are, of course, destroyed as effectively as on the exterior.

The guard constituting a feature of the invention set forth in our prior patent referred to can, of course, be used in conjunction with this invention but is not illustrated.

We claim as our invention:

1. In an insect electrocuting device, the combination with an insulated support, of a pair of concentric relatively spaced cylinders hung therefrom having a series of long parallel openings therein at equally spaced intervals to provide intervening integral wires, those of each cylinder being offset toward the other so that the wires at the offsets alternate to form a concentric third cylinder, the first named cylinders being separated at the bottom by an uninterrupted annular air space and high tension positive and negative electrical connections for the respective cylinders.

2. In an insect electrocuting device, the combination with an insulated support, of a pair of concentric relatively spaced cylinders hung therefrom having a series of long parallel openings therein at equally spaced intervals to provide intervening integral wires, those of each cylinder being offset toward the other so that the wires at the offsets alternate to form a concentric third cylinder, the first named cylinders being separated at the bottom by an uninterrupted annular air space, the first mentioned cylinders being each composed of a single piece of sheet metal.

3. In an insect electrocuting device, the combination with an insulated support, of a pair of concentric relatively spaced cylinders hung therefrom having a series of long parallel openings therein at equally spaced intervals to provide intervening integral wires, those of each cylinder being offset toward the other so that the wires at the offsets alternate to form a concentric third cylinder, the first named pair of cylinders being separated at the bottom by an uninterrupted annular air space, posts on the insulated support respectively fastened to the outer face of the outer cylinder and the inner face of the inner cylinder constituting the hanging means and providing unobstructed annular spacing between the cylinders at the top, and high tension positive and negative electrical connections for the respective cylinders.

WILLIAM F. FOLMER.
HARRISON L. CHAPIN.